(12) United States Patent
Broyles

(10) Patent No.: US 7,664,943 B2
(45) Date of Patent: Feb. 16, 2010

(54) MANAGING ACCESS TO COMPUTER COMPONENTS

(75) Inventor: Paul J. Broyles, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 607 days.

(21) Appl. No.: 11/702,241

(22) Filed: Feb. 5, 2007

(65) Prior Publication Data

US 2008/0189782 A1    Aug. 7, 2008

(51) Int. Cl.
*G06F 15/177* (2006.01)

(52) U.S. Cl. .................. 713/1; 713/2; 713/100

(58) Field of Classification Search .............. 713/1, 713/2, 100
See application file for complete search history.

(56) References Cited

U.S. PATENT DOCUMENTS

| 6,128,661 | A | * | 10/2000 | Flanagin et al. | 709/227 |
| 2002/0194415 | A1 | * | 12/2002 | Lindsay et al. | 710/305 |
| 2006/0143344 | A1 | * | 6/2006 | Lindsay et al. | 710/105 |
| 2007/0282951 | A1 | * | 12/2007 | Selimis et al. | 709/205 |

* cited by examiner

*Primary Examiner*—Dennis M Butler

(57) ABSTRACT

In one embodiment a computer system comprises a user interface and a component disable module including logic to initiate boot operations, and present, on a user interface, a component disable feature when at least one of an active management technology or an alert standard format are disabled on the computer system.

15 Claims, 2 Drawing Sheets

MANAGING ACCESS TO COMPUTER COMPONENTS

BACKGROUND

Computer systems may include components such as, e.g., network interface cards (NICs) which facilitate input/output operations to permit the computer system to communicate with other devices. NICs may be operable in accord with multiple, different management alert protocols. For example, network interface cards (NICs) may be operable in accord with the alert standard format (ASF) protocol or with the active management technology (AMT) protocol.

In some instances, owners or administrators of computer systems may need to disable a component of the computer system. For example, an owner or administrator of a computer system may need to disable a NIC to enable the use of a different networking device, e.g., a Fibre Channel device. In some circumstances, the ASF protocol and the AMT protocol limit the techniques available to owners or administrators of the computer system to manage the accessibility of a NIC or other components in the computer system.

DETAILED DESCRIPTION

Figure 1:
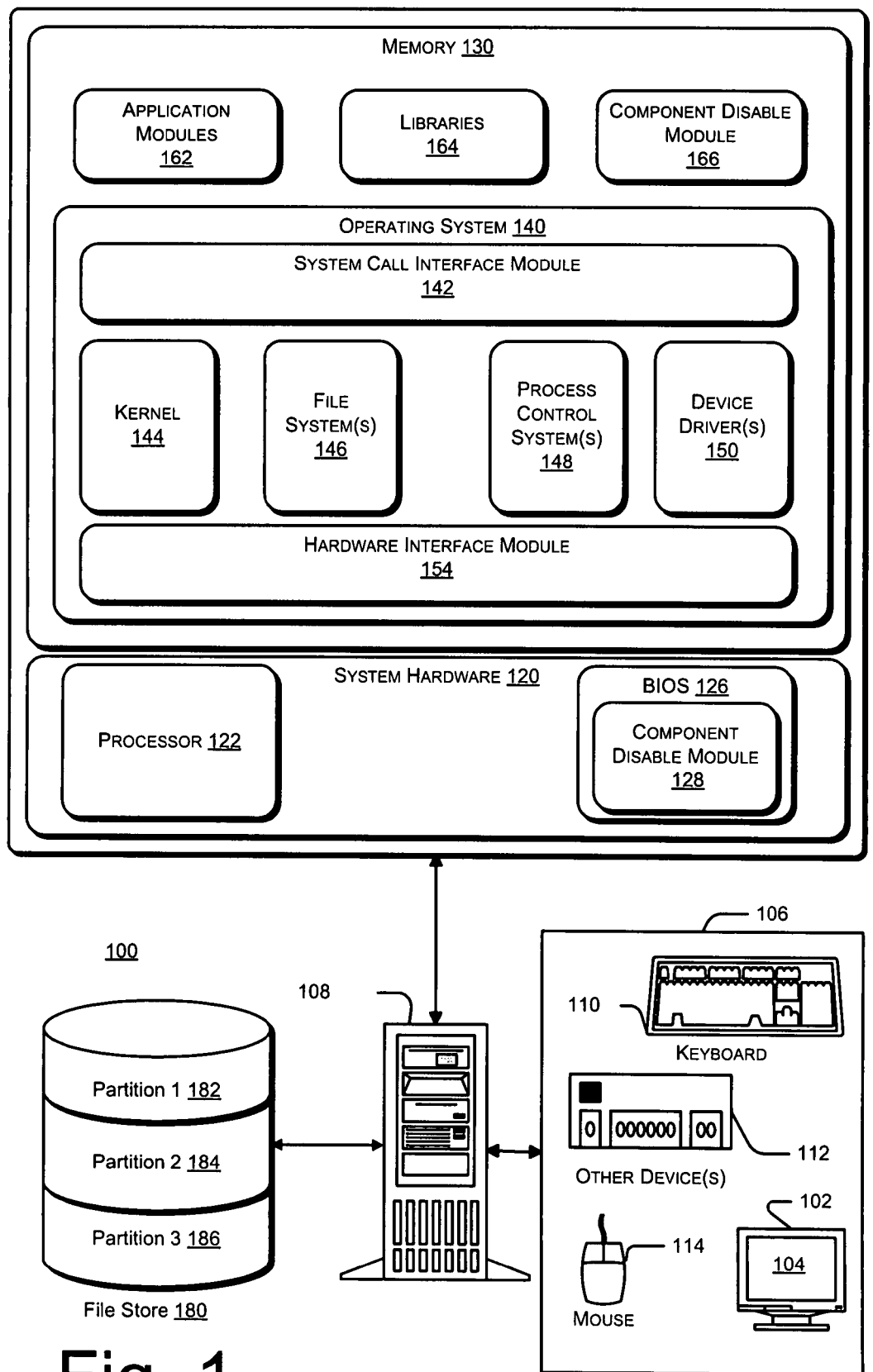
FIG. 1 is a schematic illustration of one embodiment of a computer system adapted to manage access to computer components.

FIG. 1 is a schematic illustration of a computer system 100 adapted to implement techniques to manage access to computer components. In the illustrated embodiment, computer system 100 may be embodied as a hand-held or stationary device for accessing the Internet, a desktop PCs, notebook computer, personal digital assistant, or any other processing devices that have a basic input/output system (BIOS) or equivalent.

Computer system 100 includes a computer 108 and may include one or more accompanying input/output devices 106 such as, e.g., a display 102 having a screen 104, a keyboard 110, other I/O device(s) 112, and a mouse 114. The other device(s) 112 include a touch screen, a voice-activated input device, a track ball, and any other device that enables the system 100 to receive input from a developer and/or a user.

The computer 108 includes system hardware 120 commonly implemented on a motherboard and at least one auxiliary circuit boards. System hardware 120 including a processor 122 and a basic input/output system (BIOS) 126. BIOS 126 may be implemented in flash memory and may comprise logic operations to boot the computer device and a power-on self-test (POST) module for performing system initialization and tests. In operation, when activation of computer system 100 begins processor 122 accesses BIOS 126 and shadows the instructions of BIOS 126, such as power-on self-test module, into operating memory. Processor 122 then executes power-on self-test operations to implement POST processing.

In some embodiments, computer system 100 includes at least one component disable module comprising logic instructions stored on a computer readable medium. In the embodiment depicted in FIG. 1, BIOS 126 includes a component disable module 128, which may be embodied as logic instructions stored in the computer-readable medium which stores the BIOS. In some embodiments the component disable module 128 may be stored in a different memory location, such as in memory 130 or in file store 180. For example, in some embodiments, computer system 100 may include a component disable module 166 that resides in memory 130, which may be executed during operations of computer system 100.

Computer system 100 further includes a file store 180 communicatively connected to computer 108. File store 180 may be internal such as, e.g., one or more hard drives, or external such as, e.g., one or more external hard drives, network attached storage, or a separate storage network. In some embodiments, the file store 180 may include one or more partitions 182, 184, 186.

Memory 130 includes an operating system 140 for managing operations of computer 108. In one embodiment, operating system 140 includes a hardware interface module 154 that provides an interface to system hardware 120. In addition, operating system 140 includes a kernel 144, one or more file systems 146 that manage files used in the operation of computer 108 and a process control subsystem 148 that manages processes executing on computer 108. Operating system 140 further includes one or more device drivers 150 and a system call interface module 142 that provides an interface between the operating system 140 and one or more application modules 162 and/or libraries 164. The various device drivers 150 interface with and generally control the hardware installed in the computer system 100.

In operation, one or more application modules 162 and/or libraries 164 executing on computer 108 make calls to the system call interface module 142 to execute one or more commands on the computer's processor. The system call interface module 142 invokes the services of the file systems 146 to manage the files required by the command(s) and the process control subsystem 148 to manage the process required by the command(s). The file system(s) 146 and the process control subsystem 148, in turn, invoke the services of the hardware interface module 154 to interface with the system hardware 120. The operating system kernel 144 can be generally considered as one or more software modules that are responsible for performing many operating system functions.

The particular embodiment of operating system 140 is not critical to the subject matter described herein. Operating system 140 may be embodied as a UNIX operating system or any derivative thereof (e.g., Linux, Solaris, etc.) or as a Windows® brand operating system, for example.

Figure 2:
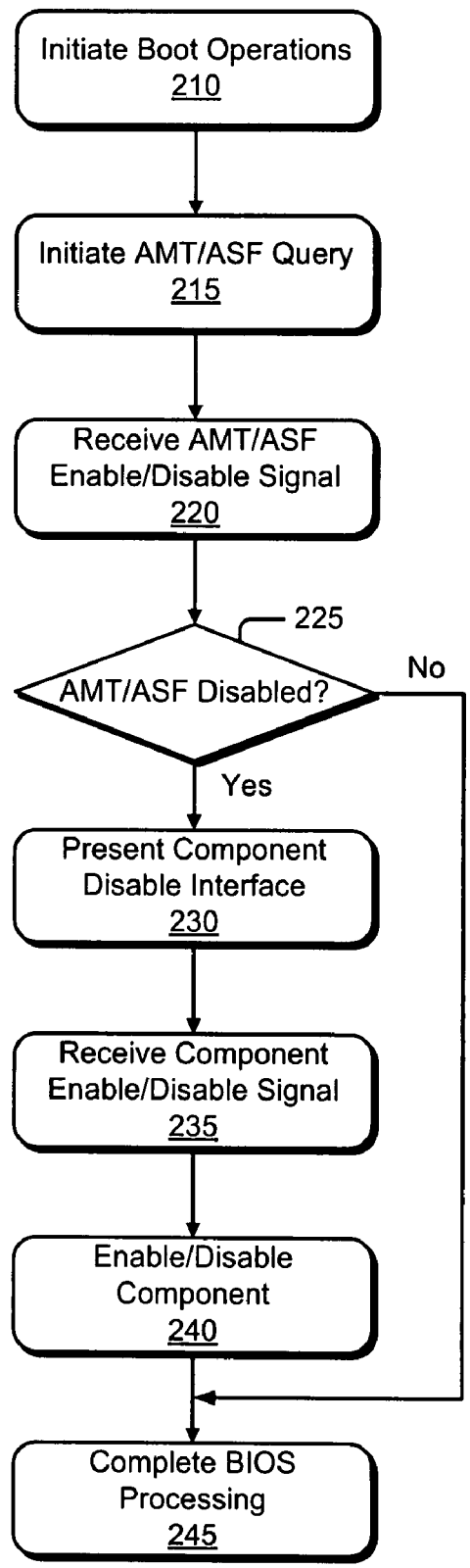
FIG. 2 is a flowchart illustrating operations in one embodiment of a method to manage access to computer components.

FIG. 2 is a flowchart illustrating operations in one embodiment of a method to manage access to computer components. In one embodiment the operations of FIG. 2 may be implemented by the component disable module 128 of BIOS 126 and/or in the component disable module 166, alone or in combination with other components of the operating system when the computer system 100 is booted. In other embodiments, the operations of FIG. 2 may be implemented by any other process invoked during the boot operation of computer system 100. For example, the operations of FIG. 2 may be implemented as a portion of the boot loader process or as a component of the operating system 140.

Referring to FIG. 2, at operation 210, BIOS 126 initiates boot operations in the computer system. At operation 215 a query is initiated to determine whether either the AMT or the ASF management protocols are enabled on computer system 100. For example, in one embodiment the component disable module 128 may query a management engine service that executes in a controller coupled to processor 122, e.g., the Memory Controller Hub (MCH). An enable/disable signal is received, at operation 220, indicating whether the AMT or ASF services are enabled or disabled on the computer system 100.

If the AMT or ASF services are not disabled at operation 225, then BIOS process is completed (operation 245). By contrast, if the AMT or ASF services are disabled at operation 225, then a component disable interface is presented on a user interface (operation 230). For example, in one embodiment a NIC disable interface is presented on the display 102 of computer system 100. The NIC disable interface presents an option for a user to enable or disable at least one NIC in the computer system 100 and receives (operation 235) one of a component enable signal or a component disable signal from a user of the computer system 100.

At operation 240 the component disable module 128 enables or disables a component in accord with the enable signal or disable signal received from the component disable interface. For example, the component disable module 128 may enable or disable a NIC in accord with the signal received from the component disable interface. BIOS process may then be further executed and/or completed (operation 245).

The methods described herein may be embodied as logic instructions on a computer-readable medium. When executed on a processor, the logic instructions cause a general purpose computer device to be programmed as a special-purpose machine that implements the described methods. The processor, when configured by the logic instructions to execute the methods recited herein, constitutes structure for performing the described methods.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A computer system, comprising:
   a user interface;
   a component disable module including logic to:
      initiate boot operations; and
      present, on the user interface, a component disable interface when at least one of an active management technology or an alert standard format are disabled on the computer system.

2. The computer system of claim 1, further comprising logic to:
   receive a component disable signal from the component disable interface, wherein the component disable signal identifies a component to disable; and
   disable the component in response to the component disable signal.

3. The computer system of claim 1, further comprising logic to:
   receive a component enable signal from the user interface, wherein the component enable signal identifies a component to enable; and
   enable the component in response to the component enable signal.

4. The computer system of claim 1, further comprising logic to:
   initiate a query to a management engine in the computer system; and
   receive a response to the query, wherein the response indicates whether at least one of an active management technology or an alert standard format are disabled on the computer system.

5. The computer system of claim 1, wherein the component disable module resides in the basic input/output system (BIOS) of the computer system.

6. A method to manage access to a component of a computer system, comprising:
   initiating boot operations;
   presenting, on a user interface, a component disable feature when at least one of an active management technology or an alert standard format are disabled on the computer system.

7. The method of claim 6, further comprising
   receiving a component disable signal from the user interface, wherein the component disable signal identifies a component to disable; and
   disabling the component in response to the component disable signal.

8. The method of claim 6, further comprising:
   receiving a component enable signal from the user interface, wherein the component enable signal identifies a component to enable; and
   enabling the component in response to the component enable signal.

9. The method of claim 6, further comprising:
   initiating a query to a management engine in the computer system; and
   receiving a response to the query, wherein the response indicates whether at least one of an active management technology or an alert standard format are disabled on the computer system.

10. The method of claim 6, further comprising initiating boot operations in the basic input/output system (BIOS) of the computer system.

11. A computer program product comprising logic instructions stored on a computer-readable medium which, when executed by a computer processor, configure the processor to:
    initiate boot operations; and
    present, on a user interface, a component disable feature when at least one of an active management technology or an alert standard format are disabled on the computer system.

12. The computer program product of claim 11, further comprising logic instructions stored on a computer-readable medium which, when executed by a computer processor, configure the processor to:
    receive a component disable signal from the user interface, wherein the component disable signal identifies a component to disable; and
    disable the component in response to the component disable signal.

13. The computer program product of claim 11, further comprising logic instructions stored on a computer-readable medium which, when executed by a computer processor, configure the processor to:
    receive a component enable signal from the user interface, wherein the component enable signal identifies a component to enable; and
    enable the component in response to the component enable signal.

14. The computer program product of claim 11, further comprising logic instructions stored on a computer-readable medium which, when executed by a computer processor, configure the processor to:
    initiate a query to a management engine in the computer system; and receive a response to the query, wherein the response indicates whether at least one of an active management technology or an alert standard format are disabled on the computer system.

15. The computer program product of claim 11, further comprising logic instructions stored on a computer-readable medium which, when executed by a computer processor, configure the processor to initiate boot operations in the basic input/output system (BIOS) of the computer system.

* * * * *